Aug. 4, 1964  E. D. PRETTI  3,143,139
DISTRIBUTING VALVE
Filed Nov. 16, 1961  2 Sheets-Sheet 1
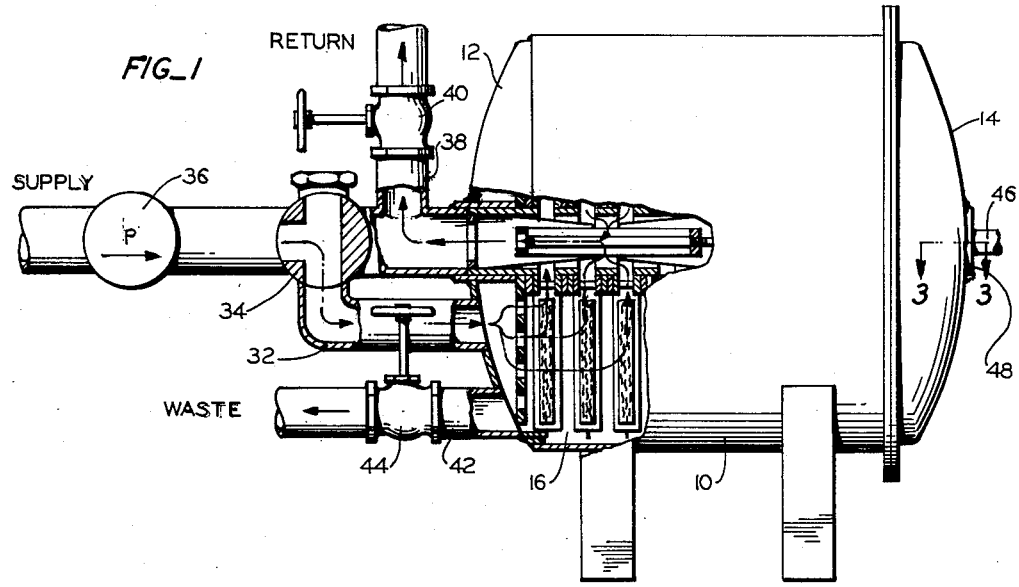
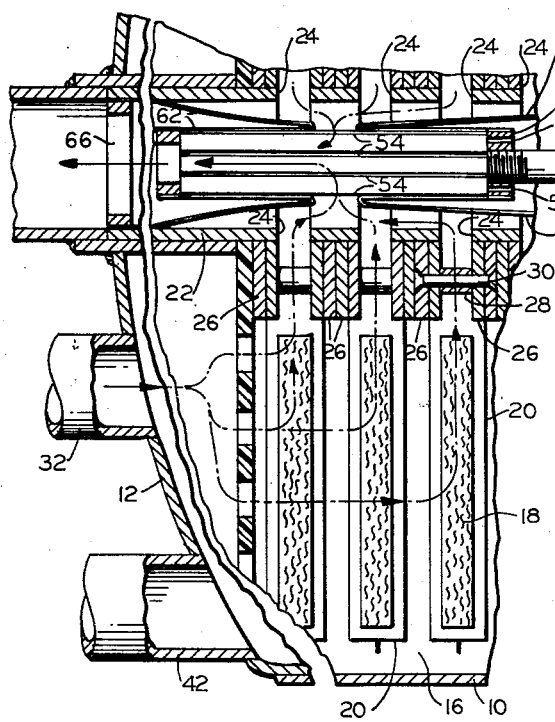
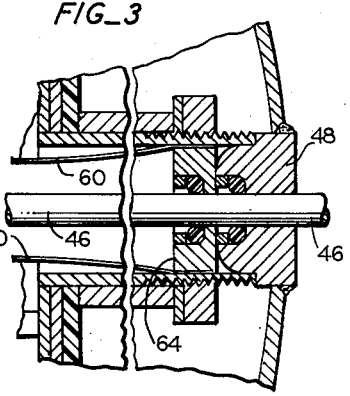
INVENTOR
EUGENE D. PRETTI
BY Naylor & Neal
ATTORNEYS Aug. 4, 1964     E. D. PRETTI     3,143,139
DISTRIBUTING VALVE
Filed Nov. 16, 1961     2 Sheets-Sheet 2
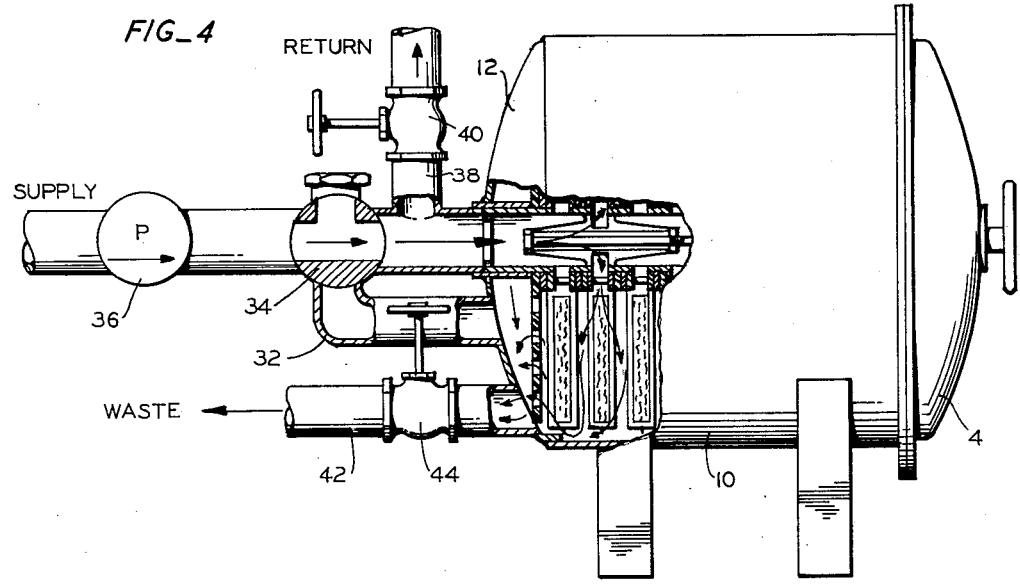
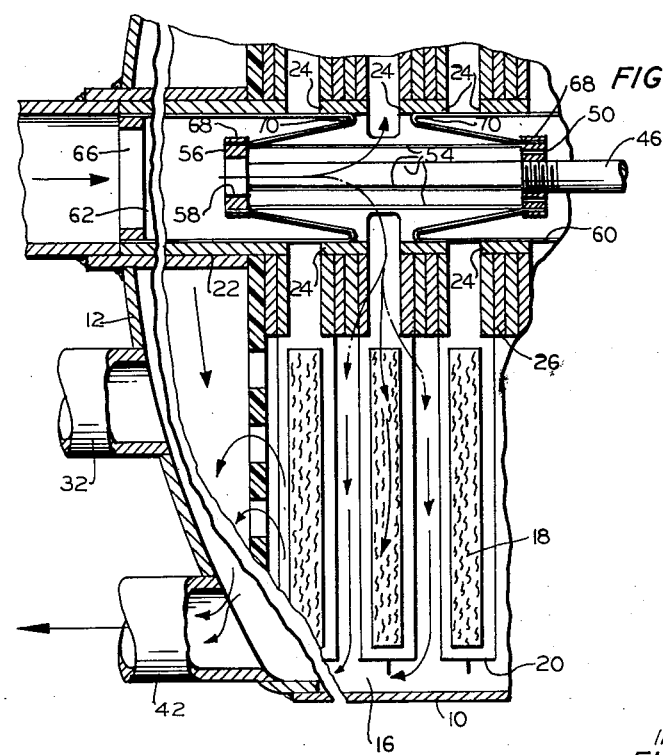
INVENTOR
EUGENE D. PRETTI
BY *Naylor & Neal*
ATTORNEYS United States Patent Office 3,143,139
Patented Aug. 4, 1964

3,143,139
DISTRIBUTING VALVE
Eugene D. Pretti, Berkeley, Calif., assignor to Jacuzzi Bros., Inc., Richmond, Calif., a corporation of California
Filed Nov. 16, 1961, Ser. No. 152,876
6 Claims. (Cl. 137—590)

This invention relates to valve means and more particularly to distributing valves for controlling fluid flow through selected portions of a group of fluid conducting passageways. The valve means of this invention is particularly useful in backwashable filters such as the filter shown in application for Letters Patent of Floyd M. Nash, Serial Number 69,847, filed November 17, 1960, for "Backwashing Pressure Filter."

It is a principal object of the invention to provide a distributing valve for controlling fluid flow through selected portions of a group of fluid conducting passageways.

It is another principal object of the invention to provide such a distributing valve which will efficiently seal a large number of the passageways of the group while directing fluid flow through the remainder of the passageways in the group.

It is another object of the invention to provide such a distributing valve which may be manipulated for sealing and unsealing a large number of passageways without appreciable wear to the element which effects such sealing.

It is another object of the invention to provide such a distributing valve which will operate efficiently and with very little wear to its components even when controlling large volumes of fluid maintained at high pressures and fluids which are laden with solid particles.

It is another object of the invention to provide such a distributing valve which may be constructed economically and operated very simply and efficiently.

It is another object of the invention to provide a valve capable of functioning efficiently in this manner as a distributing valve when fluid is passed in one direction through the group of fluid passageways and which will permit simultaneous flow of fluid through all of the passageways when fluid is passing the reverse direction.

It is another object of the invention to provide such a distributing valve which is particularly well suited for use in backwashable filters such as the filter shown in the above-mentioned Nash application, and it is a specific objective of the invention to provide such a distributing valve which may be used in the practice of the method shown in the Nash application.

Other objects and advantages of the invention will become more apparent from the following description read in conjunction with the attached drawings in which:

FIG. 1 is a side elevation partially broken away of filtering apparatus constructed in accordance with the above-mentioned Nash application and employing the distributing valve of this invention;

FIG. 2 is an enlarged view of a portion of the apparatus of FIG. 1 showing in slightly greater detail the distributing valve employed therein with fluid flowing in a "forward" direction through the distributing valve;

FIG. 3 is a sectional view of the apparatus of FIG. 1 taken along the plane 3—3 therein;

FIG. 4 is a side elevation of the apparatus of FIG. 1 showing the parts thereof arranged for "reverse" flow of fluid therein; and FIG. 5 is an enlarged view of a portion of the apparatus of FIG. 4.

Referring now in detail to the drawings, a tank 10 is provided with head members 12 and 14 defining a chamber 16 in the tank in which are mounted a plurality of waffle type filters each of which includes a central supporting annulus 18 constructed of Fiberglas or the like surrounded by a bag type filter 20 which may be impregnated with diatomaceous earth or the like. A tube 22 extends centrally through the tank and is provided with a plurality of radially extending apertures 24 therein. A plurality of suitable support elements 26 is mounted on the tube 22 maintaining the mouths of the filter bags 20 in alignment with the apertures 24. For this purpose, the support elements 26 are spaced apart by spacers 28 and connector pins 30 (see FIG. 2).

A fluid supply conduit 32 is connected to the tank 10 through a valve 34 from the pressure side of a pump 36, and a fluid return conduit 38 having a valve 40 therein is connected to the tube 22 whereby these elements, as shown in FIG. 1, provide fluid flow in the direction of the arrows in FIG. 1 with fluid entering the chamber 16 from the supply conduit 32, then passing through the filters 20 and the apertures 24 in the tube 22 and hence out the fluid return conduit 38. A fluid waste conduit 42 having a valve 44 therein is connected to the tank 10 in communication with the chamber 16 with the valve 44 being closed when the equipment is employed for filtering in the manner illustrated in FIG. 1.

When it is desirable to backwash the filter elements in the apparatus the valve 44 is opened; the valve 40 is closed, and the valve 34 is moved to the position illustrated in FIG. 4 where it conveys fluid from the pressure side of pump 36 to the tube 22 in the tank 10. With the valves arranged in this manner fluid flows along the paths indicated by the arrows in FIG. 4 from the pump 36 through the valve 34; hence, through the tube 22 and the apertures 24 therein; hence, in a backwashing direction through the filter elements 20 and out of the tank through the waste conduit 42 and valve 44.

Distributing valve means are provided in the tube 22 to concentrate the fluid output of pump 36 during backwashing into concentrated flow through individual apertures 24 in the tube 22 so that high pressure-high volume flow of fluid is provided through each of the filter elements sequentially to thereby effect more efficient backwashing of the group of filters. The distributing valve is controlled by an elongated manipulating rod 46 mounted in the tube 22 and extending from the tank 10 through a cap member 48 in the head 14. A block 50 having apertures 52 therein is mounted on the end of the rod 46 inside of the tank, and a plurality of thin rods 54 are mounted between the block 50 and a second block 56 remote from the block 50, the rods 54 defining a cage on the end of the manipulating rod 46. It should be noted that a central passageway 58 is provided through the block 56. A pair of generally cylindrical flexible membranes 60 and 62 are mounted in the tube 22 by means of collars 64 (see FIG. 3) and 66 respectively, the collar 66 having a central aperture therethrough permitting fluid flow into and out of the tube 22 axially thereof. The other ends of the membranes 60 and 62 are attached to the blocks 50 and 56 respectively by means of sleeves 68. The membranes 60 and 62 are thereby supported to define an opening 70 (see FIG. 5) which is moved longitudinally of the tube 22 responsive to movement of the manipulating rod 46. During backwashing of the filter elements 20 as described above, the manipulating rod 46 is moved axially of the tube 22 to sequentially bring the opening 70 into communication with the different apertures 24. With the opening 70 in communication with one particular aperture 24, the remaining apertures 24 are sealed off by the membranes 60 and 62, and the complete fluid output of the pump 36 is thereby passed through the one aperture 24 and the filtering element communicating therewith.

It should be noted that the apparatus is preferably constructed so that the sum of the distance between the blocks 50 and 56 and the distance between the sleeves 64 and 66 is slightly greater than the sum of the lengths of the membranes 60 and 62 so that the membranes are supported to define the apertures 70 therebetween. It should also be noted that the membranes 60 and 62 are preferably constructed to be approximately as long as the distance from each of the sleeves 64 and 66 respectively to the aperture 24 most remote therefrom, and the apparatus is constructed to permit movement of the manipulating rod 46 through a distance twice as great as the distance between the most remote apertures 24. This construction permits the opening 70 between the membranes 60 and 62 to be positioned over every one of the apertures 24 during the backwashing operation.

It will thus be seen that the distributing valve constructed in accordance with this invention provides very efficient means for distributing fluid to portions of the group of apertures 24 during backwashing of the filter elements 20, the distributing valve providing for efficient sealing of a plurality of ports with very little friction and very little wear on the membranes. It should be noted that when the valve elements are in the position illustrated in FIG. 1, normal fluid filtering will be effected with all of the filter elements 20 arranged in parallel and with all of the filter elements carrying fluid regardless of the position of the distributing valve in the apparatus since fluid flow radially inwardly through the apertures 24 will unseat the membranes 60 and 62 from the apertures 24 and permit fluid flow through all of the apertures 24 simultaneously; in this filtering arrangement, the cage structure on the end of the manipulating rod supports the membranes 60 and 62 and maintains a central fluid passageway through the tube 22.

Thus, it will be noted that the distributing valve shown herein is particularly useful in the backwashable filter structure shown, though the distributing valve has substantial utility in other environments. While a single structure for the distributing valve has been illustrated and described in detail herein, it is obvious that many modifications of the structure disclosed may be made without departing from the spirit and scope of the invention.

I claim:

1. A distributing valve for controlling fluid flow through selected ones of a group of fluid conducting apertures which comprises: an elongated tube having a plurality of apertures therethrough spaced from each other longitudinally of said tube, a pair of generally cylindrical, flexible, and fluid impervious membranes each having first and second ends thereof, said membranes being positioned in said tube with said first ends thereof attached to said tube at areas of said tube on opposite ends of said plurality of apertures, a manipulating element mounted axially in said tube in spaced relation therefrom for longitudinal movement therein and having longitudinal and radial fluid conducting passageways, and means attaching said second ends of said membranes to said manipulating element at remote areas of said manipulating element, the sum of the distance between said remote areas of said manipulating element and the distance between said areas of said tube being greater than the sum of the lengths of said membranes by an amount which is not greater than about twice the distance between adjacent apertures, whereby a passage is defined between said membranes which may be moved sequentially over said apertures responsive to movement of said manipulating element.

2. The apparatus of claim 1 in which the length of each of said membranes is at least as great as the distance from said first end thereof to the one of said apertures most remote from said first end thereof.

3. The apparatus of claim 2 in which said manipulating element is mounted in said tube to permit movement of said manipulating element longitudinally of said tube through a distance approximately as great as twice the distance between the most remote apertures of said plurality.

4. Valve means for enabling forward fluid flow simultaneously through a plurality of apertures communicating between two chambers and for selectively controlling concentrated reverse fluid flow through sequentially selected ones of said apertures which comprises: a tank defining a chamber therein, an elongated tube extending through a portion of said chamber and having a plurality of apertures extending therethrough positioned sequentially along the length of said tube, a manipulating element having axial and radial fluid passages therethrough mounted in said tube for longitudinal movement therein, a pair of generally cylindrical, flexible and fluid impervious membranes having first and second ends thereof, said membranes being mounted in said tube with said first ends thereof attached to said tube at areas of said tube on opposite ends of said plurality of apertures and with said second ends thereof attached to said manipulating element at remote areas of said manipulating element, the sum of the distance between said areas of said tube and the distance between said remote areas of said manipulating element being greater than the sum of the lengths of said membranes by an amount which is not greater than about twice the distance between adjacent apertures, whereby a passage is defined between said membranes which may be moved sequentially over said apertures responsive to movement of said manipulating element, and fluid supply and delivery means connected to said tube and tank for selectively passing fluid outside of said tank from said tube into said chamber to effect said forward flow and for passing fluid outside of said tank into said tube and out of said chamber while reciprocating said manipulating element to thereby effect said reverse flow through selected ones of said apertures.

5. The apparatus of claim 4 in which the length of each of said membranes is at least as great as the distance from said first end thereof to the one of said apertures most remote from said first end thereof.

6. The apparatus of claim 5 in which said manipulating element is mounted in said tube to permit movement of said manipulating element longitudinally of said tube through a distance approximately as great as twice the distance between the most remote apertures of said plurality.

References Cited in the file of this patent

UNITED STATES PATENTS

| | | |
|---|---|---|
| 402,738 | Hyatt | May 7, 1889 |
| 2,173,060 | Andrews | Sept. 12, 1939 |
| 2,679,863 | Tucker | June 1, 1954 |
| 2,946,447 | Welz | July 26, 1960 |

FOREIGN PATENTS

| | | |
|---|---|---|
| 1,056,442 | Germany | Apr. 30, 1959 |